United States Patent
Kurokawa

(10) Patent No.: US 9,884,956 B2
(45) Date of Patent: Feb. 6, 2018

(54) THERMOPLASTIC ELASTOMER COMPOSITION

(71) Applicant: Sumitomo Chemical Company, Limited, Tokyo (JP)

(72) Inventor: Ryosuke Kurokawa, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 73 days.

(21) Appl. No.: 15/045,499

(22) Filed: Feb. 17, 2016

(65) Prior Publication Data

US 2016/0244599 A1 Aug. 25, 2016

(30) Foreign Application Priority Data

Feb. 19, 2015 (JP) ................................ 2015-030287

(51) Int. Cl.
| | | |
|---|---|---|
| *C08L 23/08* | (2006.01) | |
| *C08L 23/12* | (2006.01) | |
| *C08L 23/16* | (2006.01) | |
| *C08K 5/54* | (2006.01) | |
| *C08K 3/32* | (2006.01) | |
| *C08K 5/053* | (2006.01) | |
| *C08K 5/14* | (2006.01) | |

(52) U.S. Cl.
CPC ............ *C08L 23/0815* (2013.01); *C08K 3/32* (2013.01); *C08K 5/053* (2013.01); *C08K 5/14* (2013.01); *C08K 5/54* (2013.01); *C08L 23/12* (2013.01); *C08L 23/16* (2013.01); *C08L 2205/02* (2013.01); *C08L 2207/02* (2013.01)

(58) Field of Classification Search
CPC ...... C08L 23/0815; C08L 23/12; C08L 23/16; C08L 2205/02; C08L 2207/02; C08K 5/54; C08K 3/32; C08K 5/053; C08K 5/14

USPC ......................................................... 524/141
See application file for complete search history.

(56) References Cited

U.S. PATENT DOCUMENTS

| | | | |
|---|---|---|---|
| 2012/0261163 A1* | 10/2012 | Tai ...................... | C08L 23/0815 174/136 |
| 2014/0039108 A1 | 2/2014 | Kurokawa et al. | |
| 2015/0183972 A1 | 7/2015 | Kurokawa et al. | |

FOREIGN PATENT DOCUMENTS

| | | | |
|---|---|---|---|
| JP | 2005060603 | A | 3/2005 |
| JP | 2008063458 | A | 3/2008 |
| JP | 2008208269 | A | 9/2008 |
| JP | 2010222402 | A | 10/2010 |
| JP | 2013515827 | A | 5/2013 |
| JP | 2014043564 | A | 3/2014 |
| JP | 2015124331 | A | 7/2015 |
| WO | 2010063748 | A1 | 6/2010 |
| WO | 2011079457 | A1 | 7/2011 |

\* cited by examiner

*Primary Examiner* — Angela C Scott
(74) *Attorney, Agent, or Firm* — Panitch Schwarze Belisario & Nadel LLP

(57) ABSTRACT

There are provided a thermoplastic elastomer composition from which a molded article excellent in softness, flame retardancy, tensile properties, and appearance can be obtained and which is excellent in flowability, and a molded article thereof. The thermoplastic elastomer composition includes a thermoplastic elastomer obtained by reacting an ethylene copolymer comprising monomer units derived from ethylene and monomer units derived from at least one selected from the group consisting of propylene and α-olefins having 4 to 10 carbon atoms (component (A)), a propylene polymer (component (B)), and a crosslinking agent, a phosphoric acid salt compound (component (C)), a metal oxide including a metal having an atomic weight of 22 to 64 or a metal hydroxide including a metal having an atomic weight of 22 to 64 (component (D)), and a polyhydric compound (component (E)).

4 Claims, No Drawings

THERMOPLASTIC ELASTOMER COMPOSITION

BACKGROUND OF THE INVENTION

Technical Field

The present invention relates to a thermoplastic elastomer composition from which a molded article excellent in softness, flame retardancy, tensile properties, and appearance can be obtained and which is excellent in flowability.

Background Art

Thermoplastic elastomer compositions are used for automobile interior parts, automobile exterior parts, electrical machinery parts, household electric appliance parts, a packaging members, materials for agriculture, members for building, etc. In recent years, aiming at applications to materials which are required to have flame retardancy, such as wire covering materials and electronic parts, thermoplastic elastomer compositions having flame retardancy are under development (patent documents 1 to 3).

RELATED ART DOCUMENTS

Patent Document 1: JP-A-2010-222402
Patent Document 2: JP-A-2005-60603
Patent Document 3: JP-A-2008-63458

SUMMARY OF THE INVENTION

Problems to be Solved by the Invention

However, the thermoplastic elastomer compositions disclosed in the patent documents are not satisfactory in flowability and the oil resistance, the softness, flame retardancy, and tensile properties of molded articles of the thermoplastic elastomer compositions are unsatisfactory.

The object of the present invention is to provide a thermoplastic elastomer composition from which a molded article excellent in softness, flame retardancy, tensile properties, and appearance can be obtained and which is excellent in flowability, and a molded article thereof.

Means for Solving the Problems

That is, the present invention relates to an ethylene copolymer comprising:
a thermoplastic elastomer obtained by reacting:
an ethylene copolymer comprising 50% by weight to 95% by weight of monomer units derived from ethylene and 5% by weight to 50% by weight of monomer units derived from at least one selected from the group consisting of propylene and α-olefins having 4 to 10 carbon atoms (component (A)) where the total amount of the monomer units derived from ethylene and the monomer units derived from at least one selected from the group consisting of propylene and α-olefins having 4 to 10 carbon atoms is taken as 100% by weight,
a propylene polymer comprising monomer units derived from propylene, wherein the content of the monomer units derived from propylene exceeds 50% by weight (component (B)), where the whole amount of the component (B) is taken as 100% by weight, and
a crosslinking agent, wherein the weight ratio of the component (A) before reacting with the crosslinking agent to the component (B) before reacting with the crosslinking agent (the weight of the component (A)/the weight of the component (B)) is from 0.5 to 20, and further comprising:
35 parts by weight to 200 parts by weight of a phosphoric acid salt compound (component (C)),
0.1 parts by weight to 40 parts by weight of a metal oxide comprising a metal having an atomic weight of 22 to 64 or a metal hydroxide comprising a metal having an atomic weight of 22 to 64 (component (D)), and
0.1 parts by weight to 40 parts by weight of a polyhydric compound (component (E)), the contents of the components (C), (D) and (E) each being based on 100 parts by weight in total of the component (A) before reacting with the crosslinking agent and the component (B) before reacting with the crosslinking agent.
wherein the weight ratio of the component (C) to the component (D) (the weight of the component (C)/the weight of the component (D)) is from 4 to 200.

The present invention can provide a thermoplastic elastomer composition which is excellent in flowability and from which a molded article excellent in softness, flame retardancy, tensile properties, and appearance, and a molded article thereof.

DETAILED DESCRIPTION OF THE INVENTION

Mode for Carrying Out the Invention

The thermoplastic elastomer of the present invention is an elastomer obtained by reacting an ethylene copolymer (component (A)), a propylene polymer (component (B)), and a crosslinking agent.

Ethylene Copolymer (A)

The ethylene copolymer (hereinafter referred to as component (A)) is a copolymer comprising monomer units derived from ethylene and monomer units derived from at least one selected from the group consisting of propylene and α-olefins having 4 to 10 carbon atoms.

Examples of the α-olefin having 4 to 10 carbon atoms include 1-butene, 2-methylpropylene, 1-pentene, 3-methyl-1-butene, 1-hexene, 4-methyl-1-pentene, and 1-octene. Such α-olefins having 4 to 10 carbon atoms may be used individually or alternatively may be used in combination.

The monomer unit derived from at least one selected from the group consisting of propylene and α-olefins having 4 to 10 carbon atoms is more preferably a monomer unit derived from propylene, a monomer unit derived from 1-butene, or a monomer unit derived from 1-octene.

The component (A) may have, in addition to the monomer units derived from ethylene and the monomer units derived from at least one selected from the group consisting of propylene and α-olefins having 4 to 10 carbon atoms, monomer units derived from a different monomer. Examples of such a different monomer include conjugated dienes having 4 to 8 carbon atoms such as 1,3-butadiene, 2-methyl-1,3-butadiene, 1,3-pentadiene, and 2,3-dimethyl-1,3-butadiene; non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl carboxylates such as vinyl acetate; unsaturated carboxylic acid esters, such as methyl acrylate, ethyl acrylate, butyl acrylate, methyl methacrylate, and ethyl methacrylate; and unsaturated carboxylic acids, such as acrylic acid and methacrylic acid. Such another monomer is preferably a non-conjugated diene having 5 to 15 carbon atoms, and more preferably is 5-ethylidene-2-norbornene or dicyclopentadiene. The component (A) may contain monomer units derived from two or more such other monomers.

The content of monomer units derived from ethylene in the component (A) is 50% by weight to 95% by weight, preferably 53% by weight to 85% by weight, and the content of monomer units derived from at least one selected from the group consisting of propylene and α-olefins having 4 to 10 carbon atoms is 5% by weight to 50% by weight, preferably 15% by weight to 47% by weight, where the total amount of the monomer units derived from ethylene and the monomer units derived from at least one selected from the group consisting of propylene and α-olefins having 4 to 10 carbon atoms in the component (A) is taken as 100% by weight.

The content of the monomer units derived from ethylene and the content of the monomer units derived from at least one selected from the group consisting of propylene and α-olefins having 4 to 10 carbon atoms in the component (A) can be determined by infrared spectroscopy. Specifically, the infrared absorption spectrum of the component (A) is measured by using an infrared spectrophotometer, and then the content of the monomer units derived from ethylene and the content of the monomer units derived from at least one selected from the group consisting of propylene and α-olefins having 4 to 10 carbon atoms are determined in accordance with the method disclosed in "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

When the component (A) comprises, in addition to the monomer units derived from ethylene and the monomer units derived from at least one selected from the group consisting of propylene and α-olefins having 4 to 10 carbon atoms, monomer units derived from a different monomer, the content of the different monomer is 30% by weight or less, preferably 20% by weight or less, where the whole amount of the component (A) is taken as 100% by weight.

The content of the monomer units derived from the different monomer can be determined by infrared spectroscopy. Specifically, the peak intensity of a peak derived from the different monomer of the component (A) is measured by using an infrared spectrophotometer, and then the content of the monomer units derived from the different monomer in the component (A) is calculated from the peak intensity.

Examples of the component (A) include ethylene-propylene copolymers, ethylene-1-butene copolymers, ethylene-1-hexene copolymers, ethylene-1-octene copolymers, ethylene-propylene-1-butene copolymers, ethylene-propylene-1-hexene copolymers, ethylene-propylene-1-octene copolymers, ethylene-propylene-5-ethylidene-2-norbornene copolymers, ethylene-propylene-dicyclopentadiene copolymers, ethylene-propylene-1,4-hexadiene copolymers, and ethylene-propylene-5-vinyl-2-norbornene copolymers. The component (A) may be used singly or two or more thereof may be used in combination. As the component (A), ethylene-propylene copolymers or ethylene-propylene-2-norbornene copolymers are preferred, The Mooney viscosity measured at 100° C. ($ML_{1+4}100°$ C.) of the component (A) is preferably 5 to 300, more preferably 10 to 200, in order to improve the flowability of the thermoplastic elastomer composition and the oil resistance and the flame retardancy of a molded article. The Mooney viscosity ($ML_{1+4}100°$ C.) is measured in accordance with JIS K6300 (1994), and "$ML_{1+4}100°$ C." has the following meaning:
M: Mooney viscosity,
L: a large rotor was used,
100° C.: measurement temperature,
1+4: a value measured when a rotor was rotated at 2 rpm for 4 minutes after the sample was heated for 1 minute.

In order to improve the flowability of the thermoplastic elastomer composition and the flame retardancy of a molded article, the intrinsic viscosity measured in Tetralin at 135° C. of the component (A) is preferably 0.5 dl/g to 8 dl/g, more preferably 1 dl/g to 6 dl/g.

Such an intrinsic viscosity is a value obtained by measuring a reduced viscosity in tetralin at 135° C. with an Ubbelohde viscometer and then calculating the value by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

Examples of the method for producing the component (A) include polymerization methods known in the art, such as a slurry polymerization method, a solution polymerization method, a bulk polymerization method, and a gas phase polymerization method, using a Ziegler-Natta catalyst or a complex-based catalyst known in the art, such as a metallocene complex and a non-metallocene complex.

In order to improve the flowability of the thermoplastic elastomer composition and the softness, the tensile properties, and the flame retardancy of a molded article, the loading of the component (A) at the time of the production of the thermoplastic elastomer is 15% by weight to 95% by weight, preferably 30% by weight to 90% by weight, even more preferably 50% by weight to 80% by weight, relative to 100% by weight in total of the component (A) before reacting with the crosslinking agent and the component (B) before reacting with the crosslinking agent.

Propylene Polymer (Component (B))

Examples of the propylene polymer (hereinafter referred to as component (B)) include propylene homopolymers, propylene random copolymers, and propylene polymeric materials. The component (B) may be used singly or two or more thereof may be used in combination. The content of the monomer units derived from propylene in the component (B) is more than 50% by weight but not more than 100% by weight, where the whole amount of the component (B) is taken as 100% by weight.

Examples of said propylene random copolymers include:
(1) a propylene-ethylene random copolymer having a content of monomer units derived from propylene of 90% by weight to 99.5% by weight and a content of monomer units derived from ethylene of 0.5% by weight to 10% by weight, where the total amount of the monomer units derived from propylene and the monomer units derived from ethylene is taken as 100% by weight;
(2) a propylene-ethylene-α-olefin random copolymer having a content of monomer units derived from propylene of 81% by weight to 99% by weight, a content of monomer units derived from ethylene of 0.5% by weight to 9.5% by weight, and a content of monomer units derived from an α-olefin having 4 to 10 carbon atoms of 0.5% by weight to 9.5% by weight, where the total amount of the monomer units derived from propylene, the monomer units derived from ethylene, and the monomer units derived from the α-olefin having 4 to 10 carbon atoms is taken as 100% by weight; or
(3) a propylene-α-olefin random copolymer having a content of monomer units derived from propylene of 90% by weight to 99.5% by weight and a content of monomer units derived from an α-olefin having 4 to 10 carbon atoms of 0.5% by weight to 10% by weight, where the total amount of the monomer units derived from propylene and the monomer units derived from the α-olefin having 4 to 10 carbon atoms is taken as 100% by weight.

Examples of the α-olefins having 4 to 10 carbon atoms in the above-described (1) and (2) include linear α-olefins such as 1-butene, 1-pentene, 1-hexene, 1-octene, and 1-decene; and branched α-olefins such as 3-methyl-1-butene and 3-methyl-1-pentene. Such α-olefins having 4 to 10 carbon atoms may be used individually or alternatively may be used in combination.

As the methods for producing a propylene homopolymer and a propylene random copolymer, polymerization methods known in the art using polymerization catalysts known in the art are used. Examples of such methods include a slurry polymerization method, a solution polymerization method, a bulk polymerization method, a gas phase polymerization method, etc. using a Ziegler-Natta catalyst or a complex-based catalyst known in the art such as a metallocene complex and a non-metallocene complex.

The propylene polymeric material is a polymeric material composed of a propylene homopolymer component (I) and an ethylene copolymer component (II) comprising monomer units derived from at least one selected from the group consisting of propylene and α-olefins having 4 or more carbon atoms and monomer units derived from ethylene. The content of the propylene homopolymer component (I) in the propylene polymeric material is 70% by weight to 90% by weight, and the content of the ethylene copolymer component (II) is 10% by weight to 30% by weight. the content of the propylene homopolymer component (I) is preferably 75% by weight to 90% by weight, and the content of the ethylene copolymer component (II) is preferably 10% by weight to 25% by weight, where the overall amount of the propylene polymeric material is taken as 100% by weight.

The α-olefin having 4 or more carbon atoms in the ethylene copolymer component (II) is preferably an α-olefin having 4 to 20 carbon atoms, and examples thereof include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, a 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. Such an α-olefin having 4 or more carbon atoms is preferably an α-olefin having 4 to 10 carbon atoms and is more preferably 1-butene, 1-hexene, or 1-octene. Such α-olefins having 4 to 10 carbon atoms may be used individually or alternatively may be used in combination.

The content of the monomer units derived from ethylene in the ethylene copolymer component (II) is 22% by weight to 80% by weight, preferably 25% by weight to 70% by weight, more preferably 27% by weight to 60% by weight. The content of the monomer units derived from at least one selected from the group consisting of propylene and α-olefins having 4 or more carbon atoms in the ethylene copolymer component (II) is 20% by weight to 78% by weight, preferably 30% by weight to 75% by weight, and more preferably 40% by weight to 73% by weight, where the combined amount of the monomer units derived from the at least one selected from the group consisting of propylene and α-olefins having 4 or more carbon atoms and the monomer units derived from ethylene is taken as 100% by weight. The content of the monomer units derived from ethylene and the content of the monomer units derived from the at least one selected from the group consisting of propylene and α-olefins having 4 to 10 carbon atoms can be determined by infrared spectroscopy. Specifically, the infrared absorption spectrum of the ethylene copolymer component (II) is measured by using an infrared spectrophotometer, and then the content of the monomer units derived from ethylene and the content of the units derived from at least one selected from the group consisting of propylene and α-olefins having 4 or more carbon atoms are determined in accordance with the method disclosed in "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

Examples of the ethylene copolymer component (II) include a propylene-ethylene copolymer, an ethylene-1-butene copolymer, an ethylene-1-hexene copolymer, an ethylene-1-octene copolymer, a propylene-ethylene-1-butene copolymer, a propylene-ethylene-1-hexene copolymer, and a propylene-ethylene-1-octene copolymer; a propylene-ethylene copolymer or a propylene-ethylene-1-butene copolymer is preferable. The ethylene copolymer component (II) may be either a random copolymer or a block copolymer.

One example of a method for producing the propylene polymeric material is a method of performing multistage polymerization using a polymerization catalyst. One example is a method in which the propylene homopolymer component (I) is produced in an earlier polymerization step and the ethylene copolymer component (II) is produced in a later polymerization step using a polymerization catalyst.

Examples of the polymerization catalyst to be used for the production of the propylene polymeric material include Ziegler catalysts, Ziegler-Natta catalysts, catalysts composed of a Group 4 transition metal compound having a cyclopentadienyl ring and an alkyl aluminoxane, and catalysts composed of a Group 4 transition metal compound having a cyclopentadienyl ring, a compound capable of reacting with the transition metal compound to form an ionic complex, and an organoaluminum compound.

A preliminarily polymerized catalyst may be used in the presence of the polymerization catalyst. Examples of the preliminarily polymerized catalyst include the catalysts disclosed in JP-A-61-218606, JP-A-61-287904, JP-A-5-194685, JP-A-7-216017, JP-A-9-316147, JP-A-10-212319, and JP-A-2004-182981.

Examples of the polymerization method used in the production of the propylene polymeric material include bulk polymerization, solution polymerization, slurry polymerization, and gas phase polymerization. Examples of an inert hydrocarbon solvent to be used for solution polymerization and slurry polymerization include propane, butane, isobutane, pentane, hexane, heptane, and octane. These polymerization methods may be performed in combination and also may be either in a batch mode or in a continuous mode. As the polymerization method to be used in the production of the propylene polymeric material, continuous gas phase polymerization or bulk-gas phase polymerization in which bulk polymerization and gas phase polymerization are performed continuously is preferred.

In order to improve the flowability of the thermoplastic elastomer composition and the flame retardancy of a molded article, the melt flow rate of the component (B) measured at 230° C. and a load of 21.18 N in accordance with JIS K7210 is preferably 0.1 g/10 minutes to 150 g/10 minutes, more preferably 0.1 g/10 minutes to 100 g/10 minutes.

As the component (B), propylene homopolymers, propylene-ethylene random copolymers, propylene-ethylene-butene random copolymers, or propylene polymeric materials are preferred, and propylene homopolymers, ethylene-propylene random copolymers, or propylene polymeric materials are more preferred.

The loading of the component (B) in the production of the thermoplastic elastomer composition is 5% by weight to 85% by weight, preferably 10% by weight to 70% by weight, more preferably 20% by weight to 50% by weight, relative to 100% by weight in total of the component (A) before reacting with the crosslinking agent and the component (B) before reacting with the crosslinking agent, in order to improve the flowability of the thermoplastic elastomer composition and the softness, the tensile properties, and the flame retardancy of a molded article.

In order to improve the flowability of the thermoplastic elastomer composition and the softness, the tensile properties, and the flame retardancy of a molded article, the weight ratio of the component (A) before reacting with the crosslinking agent to the component (B) before reacting with the crosslinking agent (the weight of the component (A)/the weight of the component (B)) is from 0.5 to 20, preferably from 1.0 to 10, more preferably from 1.5 to 5.

Crosslinking Agent

Examples of such a crosslinking agent include organic peroxides, sulfur compounds, and alkylphenol resins; organic peroxides are preferred.

Examples of such organic peroxides include ketone peroxides, diacyl peroxides, hydroperoxides, dialkyl peroxides, peroxyketals, alkyl peresters, percarbonates, peroxydicarbonates, and peroxyesters known in the art.

Examples of specific organic peroxides include dicumyl peroxide, 2,5-dimethyl-2,5-di-(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di-tert-butylperoxy)3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide. Organic peroxides may be used singly or two or more thereof may be used in combination.

In order to improve the degree of crosslinking of the thermoplastic elastomer composition, the crosslinking agent may be used in combination with a crosslinking coagent. Preferable crosslinking coagents are compounds having two or more double bonds. Examples of such a crosslinking coagent include peroxide crosslinking coagents, such as N,N-m-phenylenebismaleimide, toluylene bismaleimide, p-quinonedioxime, nitrosobenzene, diphenylguanidine, and trimethylolpropane, and divinylbenzene, triallyl cyanurate, triallyl isocyanurate, ethylene glycol dimethacrylate, polyethylene glycol dimethacrylate, trimethylolpropane trimethacrylate, and allyl methacrylate; trimethylolpropane trimethacrylate is preferred.

The loading of the crosslinking agent in the production of the thermoplastic elastomer composition is 0.01 parts by weight to 10 parts by weight, preferably 0.1 parts by weight to 5 parts by weight, more preferably 0.2 parts by weight to 2 parts by weight, relative to 100 parts by weight in total of the component (A) before reacting with the crosslinking agent and the component (B) before reacting with the crosslinking agent, in order to improve the flowability of the thermoplastic elastomer composition and the oil resistance, the softness, the tensile properties, and the flame retardancy of a molded article.

In order to improve the flowability of the thermoplastic elastomer composition and the oil resistance, the softness, the tensile properties, and the flame retardancy of a molded article, the weight ratio of the crosslinking agent to the component (A) before reacting with the crosslinking agent (the weight of the crosslinking agent/the weight of the component (A)) is preferably from 0.001 to 0.3, more preferably from 0.002 to 0.2, even more preferably from 0.003 to 0.01.

When a crosslinking coagent is used in combination with the crosslinking agent, the loading of the crosslinking coagent is preferably 0.01 parts by weight to 10 parts by weight, more preferably 0.1 parts by weight to 2 parts by weight, relative to 100 parts by weight in total of the component (A) before reacting with the crosslinking agent and the component (B) before reacting with the crosslinking agent, in order to improve the flowability of the thermoplastic elastomer composition and the oil resistance, the softness, the tensile properties, and the flame retardancy of a molded article.

The thermoplastic elastomer composition of the present invention is a composition comprising a thermoplastic elastomer, a phosphoric acid salt compound (component (C)), a metal oxide comprising a metal having an atomic weight of 22 to 64 or a metal hydroxide comprising a metal having an atomic weight of 22 to 64 (component (D)), and a polyhydric compound (component (E)).

Phosphoric Acid Salt Compound (Component (C))

Examples of the phosphoric acid salt compound (C) (hereinafter referred to as "component (C)") include a phosphate, a polyphosphate, and a compound containing such a phosphate and/or a polyphosphate as a main component. Examples of such a phosphate include melamine orthophosphate, piperazine orthophosphate, melamine pyrophosphate, piperazine pyrophosphate, calcium phosphate, and magnesium phosphate. Examples of such a polyphosphate include ammonium polyphosphate, piperazine polyphosphate, and melamine polyphosphate. The component (C) may be used singly or two or more thereof may be used in combination.

As the component (C), melamine pyrophosphate, piperazine pyrophosphate, or ammonium polyphosphate is preferred, and it is more preferred to use piperazine pyrophosphate and melamine pyrophosphate in combination. When piperazine pyrophosphate and melamine pyrophosphate are used in combination, the weight ratio of melamine pyrophosphate to piperazine pyrophosphate (the weight of melamine pyrophosphate/the weight of piperazine pyrophosphate) is preferably from 0.25 to 1.0.

There can be used compounds named by replacing the term "melamine" or "piperazine" in the above examples of the component (C) by N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethylpiperazine, 1,4-bis(2-aminoethyl)piperazine, 1,4-bis(3-aminopropyl)piperazine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, ammeline, acetoguanamine, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine, or 1,3-hexylenedimelamine.

Examples of commercially available component (C) include "ADK STAB FP-2100J" and "ADK STAB FP-2200S" produced by ADEKA Corporation, and "EXOLIT AP422" and "EXOLIT AP462" produced by Clariant Japan K.K.

The content of the component (C) in the thermoplastic elastomer composition is 35 parts by weight to 200 parts by weight, preferably 50 parts by weight to 150 parts by weight, and more preferably 60 parts by weight to 100 parts by weight relative to 100 parts by weight in total of the component (A) before reacting with the crosslinking agent and the component (B) before reacting with the crosslinking agent, in order to improve the flowability of the thermoplastic elastomer composition and the flame retardancy of a molded article.

Metal Oxide Comprising a Metal Having an Atomic Weight of 22 to 64, or Metal Hydroxide Comprising a Metal Having an Atomic Weight of 22 to 64 (Component (D))

Examples of the metal oxide comprising a metal having an atomic weight of 22 to 64, or metal hydroxide comprising a metal having an atomic weight of 22 to 64 (hereinafter referred to as "component (D)") include magnesium oxide, calcium oxide, titanium oxide, manganese oxides (MnO and $MnO_2$), iron oxides (FeO, $Fe_2O_3$, $Fe_3O_4$), copper oxide, nickel oxide, aluminum oxide, magnesium hydroxide, calcium hydroxide, aluminum hydroxide, calcium aluminate, and hydrotalcite. As the component (D), a metal oxide comprising a metal having an atomic weight of 22 to 64 is preferred in order to improve the tensile properties of a molded article.

The content of the component (D) in the thermoplastic elastomer composition is 0.1 parts by weight to 40 parts by weight, preferably 0.5 parts by weight to 10 parts by weight, and more preferably 2 parts by weight to 5 parts by weight relative to 100 parts by weight in total of the component (A) before reacting with the crosslinking agent and the component (B) before reacting with the crosslinking agent, in order to improve the flowability of the thermoplastic elastomer composition and the oil resistance, the tensile properties, and the flame retardancy of a molded article.

In order to improve the flowability of the thermoplastic elastomer composition and the oil resistance, the tensile properties, and the flame retardancy of a molded article, the weight ratio of the component (C) to the component (D) in the thermoplastic elastomer composition (the weight of the component (C)/the weight of the component (B)) is from 4 to 200, preferably from 10 to 150, more preferably from 15 to 100.

Polyhydric Compound (Component (E))

The polyhydric compound (E) (hereinafter referred to as "component (E)") is a compound containing two or more hydroxy groups. Examples of the component (E) include pentaerythritol, dipentaerythritol, tripentaerythritol, polypentaerythritol (degree of condensation 4), trishydroxyethyl isocyanate, polyethylene glycol, glycerol, starch, grape sugar, cellulose, and sorbitol. As the component (E), polyhydric alcohol compounds are preferred in terms of low solubility in water and low hygroscopicity, and pentaerythritol, dipentaerythritol, tripentaerythritol, or polypentaerythritol is more preferred, and pentaerythritol is even more preferred.

The content of the component (E) in the thermoplastic elastomer composition is 0.1 parts by weight to 40 parts by weight, preferably 0.5 parts by weight to 10 parts by weight, and more preferably 2 parts by weight to 5 parts by weight relative to 100 parts by weight in total of the component (A) before reacting with the crosslinking agent and the component (B) before reacting with the crosslinking agent, in order to improve the flowability of the thermoplastic elastomer composition and the oil resistance, the tensile properties, and the flame retardancy of a molded article.

The thermoplastic elastomer composition of the present invention may further comprise a mineral oil (component (F)) in addition to the components (A), (B), (C), and (E).

Mineral Oil (Component (F))

Examples of the mineral oil (hereinafter referred to as "component (F)") include high-boiling fractions of petroleum (having an average molecular weight of 300 to 1500 and a pour point of 0° C. or lower), such as aromatic mineral oils, nathphenic mineral oils, and paraffinic mineral oils. Paraffinic mineral oils are preferred as the component (F).

The component (F) may be blended as an extending oil of the component (A). Examples of a method for blending the component (F) with the component (A) include a method comprising mechanically kneading the component (A) and the component (F) with a roll, a Banbury mixer, or the like, a method comprising adding a prescribed amount of the component (F) to a solution of the component (A) to obtain a mixture solution, and then removing a solvent from the mixture solution by such a method as a spray drying method, a steam stripping method, a supercritical drying method using carbon dioxide or the like, and a method comprising adding an oil directly to a rubber in a latex state, stirring them, and then solidifying the rubber.

When the component (F) is blended as an extending oil of the component (A), the Mooney viscosity ($ML_{1+4}100°$ C.) measured at 100° C. of the mixture of the component (F) and the component (A) is preferably 5 to 300, more preferably 10 to 200 in order to improve the flowability of the thermoplastic elastomer composition and the oil resistance and the flame retardancy of a molded article. The Mooney viscosity ($ML_{1+4}100°$ C.) is measured in accordance with JIS K6300 (1994).

The content of the component (F) in the thermoplastic elastomer composition is preferably 200 parts by weight or less, preferably 100 parts by weight or less, and more preferably 50 parts by weight to 80 parts by weight relative to 100 parts by weight in total of the component (A) before reacting with the crosslinking agent and the component (B) before reacting with the crosslinking agent, in order to improve the flame retardancy of a molded article.

In order to improve the flowability of the thermoplastic elastomer composition and the flame retardancy of a molded article, the weight ratio of the component (F) to the component (A) before reacting with the crosslinking agent (the weight of the component (F)/the weight of the component (A)) is preferably from 0.01 to 2, more preferably from 0.05 to 1.7, even more preferably from 0.1 to 1.5.

The thermoplastic elastomer composition of the present invention may comprise a different additive or a different thermoplastic resin in addition to the above-described components (A) through (F).

Examples of the different additive include inorganic fillers, organic fillers, antioxidants, weathering stabilizers, UV absorbers, heat stabilizers, light stabilizers, antistatic agents, nucleating agents, pigments, adsorbents, metal chlorides, lubricants, and silicone compounds.

Examples of the inorganic fillers include talc, calcium carbonate, and calcined kaolin.

Examples of the organic fillers include fiber, wood flour, and cellulose powder.

Examples of antioxidants include phenol-based antioxidants, sulfur-containing antioxidants, phosphorus-containing antioxidants, lactone-based antioxidants, and vitamine-based antioxidants.

Examples of the UV absorbers include benzotriazole-based UV absorbers, triazine-based UV absorbers, anilide-based UV absorbers, and benzophenone-based UV absorbers.

Examples of the light stabilizers include hindered amine light stabilizers and benzoate-based light stabilizers.

Examples of the metal halides include iron chloride and calcium chloride.

Examples of the lubricants include fatty acids, higher alcohols, aliphatic amides, and aliphatic esters.

Examples of the different thermoplastic resin include an ethylene polymer comprising more than 95% by weight and not more than 100% by weight of monomer units derived from ethylene, where the whole amount of the ethylene resin is taken as 100% by weight.

Examples of the ethylene polymer comprising more than 95% by weight and not more than 100% by weight of monomer units derived from ethylene include an ethylene homopolymer, and a copolymer comprising monomer units derived from ethylene and monomer units derived from at least one selected from the group consisting of propylene and α-olefins having 4 to 10 carbon atoms.

The content of the different thermoplastic resin is preferably 200 parts by weight or less relative to 100 parts by weight in total of the component (A) before reacting with the crosslinking agent and the component (B) before reacting with the crosslinking agent.

The melt flow rate (MFR) (measured at a temperature of 230° C. under a load of 98.07 N in accordance with JIS K7210) of the thermoplastic elastomer composition is preferably 4 g/10 minutes or more, more preferably 5 g/10 minutes or more.

(Method for Producing Thermoplastic Elastomer Composition)

Examples of the method for producing the thermoplastic elastomer composition of the present invention include a method comprising melt-kneading the component (A), the component (B), and the crosslinking agent to obtain a thermoplastic elastomer, and then melt-kneading the thermoplastic elastomer obtained, the component (C), the component (D), the component (E). The component (F), the different additive, and the different thermoplastic resin may be blended beforehand with the component (A) or the component (B), or they may be added after or during the melt-kneading of the thermoplastic elastomer and the components (C), (D), and (E). Examples of a melt-kneading apparatus include a mixing roll, which is of an open type, a Banbury mixer an extruder, a kneader, and a continuous mixer, which are of a non-open type; apparatuses of a non-open type are preferred. It is permitted to melt-knead at once all components to be kneaded, or it is also permitted to knead some components and then add the remaining components, followed by melt-kneading. The melt-kneading may be carried out either once or twice or more. The melt-kneading temperature is preferably 150° C. to 250° C. and the melt-kneading time is preferably 30 seconds to 30 minutes. The components to be kneaded may be added in any arbitrary order and may be added simultaneously.

In order to improve the flowability of a thermoplastic elastomer composition, the oil resistance of a molded article, and flame retardancy, a method comprising melt-kneading the component (A), the component (B), and the crosslinking agent to obtain a thermoplastic elastomer, and then melt-kneading the resulting thermoplastic elastomer, the component (C), the component (D), and the component (E) is preferred as the method for producing the thermoplastic elastomer composition of the present invention.

The Shore A durometer hardness (measured in accordance with JIS K6253) of a molded article made of the thermoplastic elastomer composition is 40 to 99, preferably 50 to 95, and more preferably 60 to 90.

The density of a molded article made of the thermoplastic elastomer composition is preferably 0.8 g/cm$^3$ to 2 g/cm$^3$, more preferably 0.9 g/cm$^3$ to 1.5 g/cm$^3$, even more preferably 0.95 g/cm$^3$ to 1.3 g/cm$^3$, and further more preferably 1.0 g/cm$^3$ to 1.1 g/cm$^3$. The density is measured without annealing by the method specified in JIS K7112.

The elongation at break (measured at a tensile rate of 200 mm/minute using a JIS No. 3 specimen in accordance with JIS K6251) of a molded article made of the thermoplastic elastomer compositions is preferably 300% or more, more preferably 500% or more, and even more preferably 550% or more.

Examples of a method for producing a molded article made of the thermoplastic elastomer composition include a method known in the art, such as extrusion forming, calendering, and injection molding, using an ordinary apparatus to be used for molding of a thermoplastic resin.

Molded articles made of the thermoplastic elastomer composition can be used for automobile parts, railway vehicle parts, electrical machinery parts, household electric appliance parts, packaging members, materials for agriculture, members for building, etc., for example. They can be used, for example, for materials for covering wires (an insulated wire, a twisted pair cable, a flat cable, a coaxial cable, etc.) and electronic parts (a connector, a capacitor, an ink cartridge, a household appliance housing, an ECU case, a switch, an inverter part, an electronic substrate, a connector cover, etc.)

EXAMPLES

The present invention is described in more detail based on examples, but the invention is not limited to the Examples.
Methods for Measuring Physical Properties
(1) Mooney viscosity ($ML_{1+4}100°$ C.)

Measurement was conducted in accordance with JIS K6300.
(2) Melt flow rate (MFR; unit: g/10 minutes)

Measurement was conducted in accordance with JIS K7210.

The measurement was carried out at a temperature of 230° C. under a load of 98.07 N for thermoplastic elastomer compositions and at 230° C. under a load of 21.18 N for propylene polymers.

(3) The contents of monomer units derived from ethylene, monomer units derived from propylene, and monomer units derived from 5-ethylidene-2-norbornene (unit: % by weight)

Measurement was carried out by infrared spectroscopy (IR method). Specifically, an ethylene-propylene-5-ethylidene-2-norbornene copolymer was fabricated into a film having a thickness of about 0.5 mm, and subsequently the intensity of a peak derived from 5-ethylidene-2-norbornene) (an absorption peak at 1688 cm$^{-1}$) of the film was measured by using an infrared spectrophotometer, and then the content of the monomer units derived from 5-ethylidene-2-norbornene in the copolymer was calculated. Then, the ethylene-propylene-5-ethylidene-2-norbornene copolymer was fabricated into a film having a thickness of about 0.1 mm, and the infrared absorption spectrum of the film was measured using an infrared spectrophotometer, and then the content of the monomer units derived from ethylene and the content of the monomer units derived from propylene were calculated in accordance with the method disclosed in literature "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

(4) Press molding

A thermoplastic elastomer composition was press molded by using a compression molding machine (Model F-37) manufactured by SHINTO Metal Industries Corporation under conditions including heating and pressing at 200° C. and a maximum pressure of 10 MPa for 30 minutes and then rapidly cooling at a maximum pressure of 10 MPa by using a cooling press at a temperature of 23° C. Thus, a press molded article (1) (150 mm in length, 150 mm in width, 2 mm in thickness) was obtained. For a flame retardancy test, a press molded article (2) (150 mm in length, 150 mm in width, 1.5 mm in thickness) was obtained in a similar manner, and then a specimen having a length of 150 mm, a width of 150 mm, and a thickness of 1.5 mm was cut from the press molded article and then used.

(5) Density (unit: g/cm$^3$)

In accordance with JIS K7112, the density of a press molded article (1) produced in (4) above was measured without annealing.

(6) Hardness

The Shore A durometer hardness of a press molded article (1) produced in (4) above was measured was measured in accordance with JIS K6253.

(7) Elongation at break (unit: %)

The elongation at break of a press molded article (1) produced in (4) above was measured in accordance with JIS K6251. Measurement was carried out at a tensile rate of 200 mm/minute using a JIS No. 3 specimen.

(8) Flame retardancy test

A flame retardancy test was carried out by performing measurement in accordance with UL-94V. A specimen produced in (4) above was kept vertical, then a fire of burner was brought to the bottom end of the specimen closely for 10 seconds and the burner was taken away. The length of time taken until the fire of the specimen went out was measured. As soon as the fire went out, the fire of burner was again brought to the bottom end of the specimen closely for 10 seconds. The length of time taken until the fire of the specimen went out was measured in the same way as the first time. In addition, it was evaluated whether the cotton placed under the specimen began to burn or not due to the dropping of live charcoal on it.

From the burning times and whether the cotton began to burn or not in the first and second tests, the burning-rank was set according to the UL-94V standard.

Flame retardancy rank "⊚" was given to samples the burning rank of which corresponds to V-O, flame retardancy rank "○" was given to samples the burning rank of which corresponds to V-1, and flame retardancy rank "x" was given to samples the burning rank of which correspond to none of V-0 through V-2.

(9) Oil resistance test

In accordance with JIS K6258, a press molded article (1) produced in (4) above was immersed in No. 3 lubricating oil (IRM 903) at 100° C. for 22 hours, and then a weight change relative to the weight before the immersion was calculated, which was used as a measure of oil resistance. The rank "○" of evaluation of oil resistance was given for cases where the weight change was 150% or less, and the rank "x" of evaluation of oil resistance was given for cases where the weight change exceeded 150%.

The materials used in the Examples are as follows.

Oil-Extended Ethylene-α-Olefin Copolymer (Mixture of Component (A) and Component (F))

(A1+F1) Trade name "ESPLENE 670F" produced by Sumitomo Chemical Co., Ltd. (Material prepared by adding 100 parts by weight of a paraffinic mineral oil (F1) to 100 parts by weight of an ethylene-propylene-5-ethylidene-2-norbornene copolymer (A1))

The Mooney viscosity ($ML_{1+4}100°$ C.) of (A1+F1)=63, the content of monomer units derived from ethylene of (A1)=66% by weight, the content of monomer units derived from propylene of (A1)=30% by weight, the content of monomer units derived from 5-ethylidene-2-norbornene=4% by weight Component (B): Propylene Polymer (B1) Propylene homopolymer, produced by Sumitomo Chemical Co., Ltd., trade name:

"NOBLEN D101", MFR (230° C., 21.18 N)=0.5 g/10 minutes

Component (C): Phosphoric acid salt compound (C-1) Trade name "ADK STAB FP-2100J" produced by ADEKA, Inc.

Component (D): Metal oxide comprising a metal having an atomic weight of 22 to 64, or metal hydroxide comprising a metal having an atomic weight of 22 to 64

(D1) Trade name "Kyowamag 30" (magnesium oxide) produced by Kyowa Chemical Industry Co., Ltd.

(D2) Trade name "Vesta PP" (calcium oxide) produced by Inoue Calcium Corporation (D3) Trade name "KISUMA 5B" (magnesium hydroxide) produced by Kyowa Chemical Industry Co., Ltd.

Component (E): Polyhydric Compound (E1) Trade name "Pentarit" (pentaerythritol) produced by Koei Chemical Co., Ltd.

Crosslinking Agent

Trade name "APO-10DL" produced by Kayaku Akzo Corporation (2,5-dimethyl-2,5-di-(t-butylperoxy)hexane diluted to 10% with paraffinic mineral oil (F2) (trade name "PW-100" produced by Idemitsu Kosan, Inc.))

Antioxidant: Trade name "IRGAFOS 1010" produced by BASF Japan

Crosslinking coagent: Trade name "Hi-Cross M-P" produced by Seiko Chemical Co., Ltd.

(trimethylolpropane trimethacrylate diluted to 66.7% with silicon oxide)

Zinc oxide: Trade name "Zinc oxide Type II" produced by Seido Chemical Industry Co., Ltd.

In the following, the production thermoplastic elastomer compositions and the production of thermoplastic elastomers were performed using a 100 cc Labo Plastomill (manufactured by Toyo Seiki Seisaku-sho, Ltd.) under conditions including a rotor temperature of 190±10° C. and a revolution speed of 80 rpm.

(Production of Thermoplastic Elastomer (1))

By kneading 145.4 parts by weight of an oil-extended ethylene-α-olefin copolymer (A1+F1), 27.3 parts by weight of a propylene polymer (B1), 5.5 parts by weight of a crosslinking agent (APO-10DL), 0.5 parts by weight of a crosslinking coagent (Hi-Cross M-P), and 0.2 parts by weight of an antioxidant (IRGANOX 1010), 178.9 parts by weight of a thermoplastic elastomer (1) was obtained.

(Production of Thermoplastic Elastomers (2) to (3))

Thermoplastic elastomers were produced in the same manner as thermoplastic elastomer (1) using the components and the contents shown in Table 1.

Example 1

By kneading 178.9 parts by weight of the thermoplastic elastomer (1), 76.7 parts by weight of a phosphoric acid salt compound (C1), 2.6 parts by weight of a metal oxide comprising a metal having an atomic weight of 22 to 64 or a metal hydroxide comprising a metal having an atomic weight of 22 to 64 (D2), and 2.6 parts by weight of a polyhydric compound (E1), a thermoplastic elastomer composition was produced.

A molded article was obtained by press molding the resulting thermoplastic elastomer composition by the method described in (4) above. The physical property measurements of the molded article are shown in Table 2.

Example 2, Example 3, Comparative Examples 1 to 6

(Production of Thermoplastic Elastomer Compositions)

Thermoplastic elastomer compositions were produced in the same manner as Example 1 using the components and the contents shown in Table 2 or Table 3. Molded articles were obtained by press molding the resulting thermoplastic elastomer compositions by the method described in (4) above. The physical property measurements of the molded articles are shown in Table 2 or Table 3.

TABLE 1

| Production of thermoplastic elastomer | (1) | (2) | (3) |
|---|---|---|---|
| A1 + F1 | 145.4 | 127.6 | 38.0 |
| (A1) | 72.7 | 63.8 | 19.0 |
| (F1) | 72.7 | 63.8 | 19.0 |
| B1 | 27.3 | 36.2 | 81.0 |
| APO-10L | 5.5 | 4.9 | 0.34 |
| (F2) | 4.95 | 4.41 | 0.31 |
| Hi-Cross M-P | 0.5 | 0.5 | 0.2 |
| Irganox 1010 | 0.2 | 0.2 | 0.2 |
| A1/B1 | 2.7 | 1.8 | 0.2 |
| Total weight (parts by weight) | 178.9 | 169.4 | 138.9 |

TABLE 2

| | Example | | | Comparative Example | |
|---|---|---|---|---|---|
| | 1 | 2 | 3 | 1 | 2 |
| Thermoplastic elastomer 1 | 178.9 | 178.9 | 0 | 178.9 | 178.9 |
| Thermoplastic elastomer 2 | 0 | 0 | 169.4 | 0 | 0 |
| Thermoplastic elastomer 3 | 0 | 0 | 0 | 0 | 0 |
| Zinc oxide | 0 | 0 | 0 | 0 | 2.6 |
| C1 | 76.7 | 76.7 | 71.1 | 76.7 | 76.7 |
| D1 | 0 | 0 | 2.5 | 0 | 0 |
| D2 | 2.6 | 0 | 0 | 0 | 0 |
| D3 | 0 | 2.6 | 0 | 0 | 0 |
| E1 | 2.6 | 2.6 | 2.5 | 2.6 | 2.6 |
| MFR (g/10 minutes) | 6.2 | 8.5 | 17 | 6.1 | 2.9 |
| Shore A durometer hardness | 75 | 75 | 85 | 76 | 74 |
| Elongation at break (%) | 550 | 530 | 580 | 490 | 510 |
| Flame retardancy | ⊚ | ⊚ | ⊚ | X | ⊚ |
| Density (g/cm³) | 1.03 | 1.03 | 1.03 | 1.03 | 1.04 |
| Oil resistance | ○ | ○ | ○ | ○ | X |

TABLE 3

| | Comparative Example | | | |
|---|---|---|---|---|
| | 3 | 4 | 5 | 6 |
| Thermoplastic elastomer 1 | 178.9 | 178.9 | 0 | 178.9 |
| Thermoplastic elastomer 2 | 0 | 0 | 0 | 0 |
| Thermoplastic elastomer 3 | 0 | 0 | 138.9 | 0 |
| Zinc oxide | 0 | 0 | 0 | 0 |
| C1 | 96.3 | 0 | 50.0 | 96.3 |
| D1 | 2.8 | 0 | 1.7 | 27.5 |
| D2 | 0 | 0 | 0 | 0 |
| D3 | 0 | 96.3 | 0 | 0 |
| E1 | 0 | 0 | 1.7 | 2.8 |
| MFR (g/10 minutes) | 0.9 | 7.2 | 280 | 5.1 |
| Shore A durometer hardness | 77 | 76 | 100 | 83 |
| Elongation at break (%) | 380 | 560 | 25 | 580 |
| Flame retardancy | ○ | X | ⊚ | X |
| Density (g/cm³) | 1.05 | 1.13 | 1.03 | 1.11 |
| Oil resistance | ○ | X | ○ | X |

What is claimed is:

1. A thermoplastic elastomer composition comprising:
a thermoplastic elastomer obtained by reacting:
an ethylene copolymer comprising 50% by weight to 95% by weight of monomer units derived from ethylene and 5% by weight to 50% by weight of monomer units derived from at least one selected from the group consisting of propylene and α-olefins having 4 to 10 carbon atoms (component (A)) where the total amount of the monomer units derived from ethylene and the monomer units derived from at least one selected from the group consisting of propylene and α-olefins having 4 to 10 carbon atoms is taken as 100% by weight,
a propylene polymer comprising monomer units derived from propylene, wherein the content of the monomer units derived from propylene exceeds 50% by weight (component (B)), where the whole amount of the component (B) is taken as 100% by weight, and
a crosslinking agent, wherein the weight ratio of the component (A) before reacting with the crosslinking agent to the component (B) before reacting with the crosslinking agent (the weight of the component (A)/the weight of the component (B)) is from 0.5 to 20, and further comprising
35 parts by weight to 200 parts by weight of a phosphoric acid salt compound (component (C)),
0.1 parts by weight to 40 parts by weight of a metal oxide comprising a metal having an atomic weight of 22 to 64 or a metal hydroxide comprising a metal having an atomic weight of 22 to 64 (component (D)), and
0.1 parts by weight to 40 parts by weight of a polyhydric compound (component (E)), the contents of the component (C), the component (D), and the component (E) each being based on 100 parts by weight in total of the component (A) before reacting with the crosslinking agent and the component (B) before reacting with the crosslinking agent,
wherein the weight ratio of the component (C) to the component (D) (the weight of the component (C)/the weight of the component (D)) is from 4 to 200 and wherein the thermoplastic elastomer composition contains no zinc oxide.

2. The thermoplastic elastomer composition according to claim 1 further comprising a mineral oil (component (F)), wherein the weight ratio of the component (F) to the component (A) before reacting with the crosslinking agent (the weight of the component (F)/component (A)) is from 0.01 to 2.

3. A molded article made of the thermoplastic elastomer composition according to claim 2.

4. A molded article made of the thermoplastic elastomer composition according to claim 1.

* * * * *